United States Patent
Gerber

(10) Patent No.: US 8,131,738 B2
(45) Date of Patent: Mar. 6, 2012

(54) SEARCH ENGINE SERVICE UTILIZING HASH ALGORITHMS

(75) Inventor: Benjamin S. Gerber, Southfield, MI (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/345,842

(22) Filed: Dec. 30, 2008

(65) Prior Publication Data

US 2010/0169293 A1    Jul. 1, 2010

(51) Int. Cl.
G06F 7/00 (2006.01)
G06F 17/00 (2006.01)
G06F 17/30 (2006.01)

(52) U.S. Cl. .......................... 707/757; 707/706
(58) Field of Classification Search .................... 707/706
See application file for complete search history.

(56) References Cited

U.S. PATENT DOCUMENTS

| | | | |
|---|---|---|---|
| 5,694,593 A | 12/1997 | Baclawski | |
| 6,021,409 A | 2/2000 | Burrows | |
| 6,505,191 B1 | 1/2003 | Baclawski | |
| 6,850,954 B2 | 2/2005 | Kawamae et al. | |
| 2004/0034628 A1 | 2/2004 | Numao et al. | |
| 2005/0166046 A1* | 7/2005 | Bellovin et al. | 713/165 |
| 2005/0259817 A1 | 11/2005 | Ramzan et al. | |
| 2008/0059462 A1 | 3/2008 | Millet et al. | |

FOREIGN PATENT DOCUMENTS

| | | |
|---|---|---|
| JP | 2002-297606 A | 10/2002 |
| JP | 2007-052698 A | 3/2007 |
| JP | 2007-124520 A | 5/2007 |
| JP | 2008-500598 A | 1/2008 |

OTHER PUBLICATIONS

Baldwin, "Enhanced Accountability for Electronic Processes", iTrust 2004, LNCS 2995, pp. 319-332, 2004, Springer-Verlag Berlin Heidelberg.*
Shen, et al., "Privacy Protection in Personalized Search," ACM SIGIR Forum, vol. 41 No. 1, Jun. 2007.
"Secret Searching" www.IP.com 2006.
Shinsaku Kiyomoto et al., "Implementation of a Searchable Encrypted Database by One World" Technical Report of IEICE, The Institute of Electronics Information and Communication Engineers, Sep. 25, 2003, vol. 27 No. 51, p. 41-46.
Information Materials for IDS for dated Dec. 14, 2011.

* cited by examiner

*Primary Examiner* — Michael Hicks
(74) *Attorney, Agent, or Firm* — Brown & Michaels, PC

(57) ABSTRACT

A secure search method of securing searches by a user through a hash provider using a search engine. The user registers with the hash provider. The hash provider sends a unique number, encrypted result database, and hashed index to the search engine. The user enters in at least one search term to be searched. The user hashes the search term and sends the search term to the search engine with the unique number. The search engine searches and selects the hashed index and encrypted result database based on the unique number. The encrypted result data set taken from the encrypted result database is sent to user. The user decrypts the result set.

5 Claims, 3 Drawing Sheets

SEARCH ENGINE SERVICE UTILIZING HASH ALGORITHMS

BACKGROUND OF THE INVENTION

The present invention relates to search engines, and more specifically to search engines using hash algorithms.

Organizations that operate web search engines acquire a great deal of information about individuals based on the search terms individuals enter into search engines. Search terms reveal individual everyday activities, business pursuits, personal thoughts. This large scale and very detailed accumulation of individual's searches leads to a great number of privacy concerns.

Some search engines have decided to make it part of their business strategy to offer privacy enhancements to their search services. Existing "privacy enhanced" search engine implementations differ from most search engines in that they do not log search terms and results, or the operating organization only maintains the logs for a minimum period of time. However, with this type of implementation, the organization that operates the search engine still has access to the search terms and results.

SUMMARY OF THE INVENTION

A secure search method of securing searches by a user through a hash provider using a search engine. The user registers with the hash provider. The hash provider sends a unique number, encrypted result database, and hashed index to the search engine. The user enters in at least one search term to be searched. The user hashes the search term and sends the search term to the search engine with the unique number. The search engine searches and selects the hashed index and encrypted result database based on the unique number. The encrypted result data set taken from the encrypted result database is sent to user. The user decrypts the result set.

DETAILED DESCRIPTION OF THE INVENTION

Figure 1:
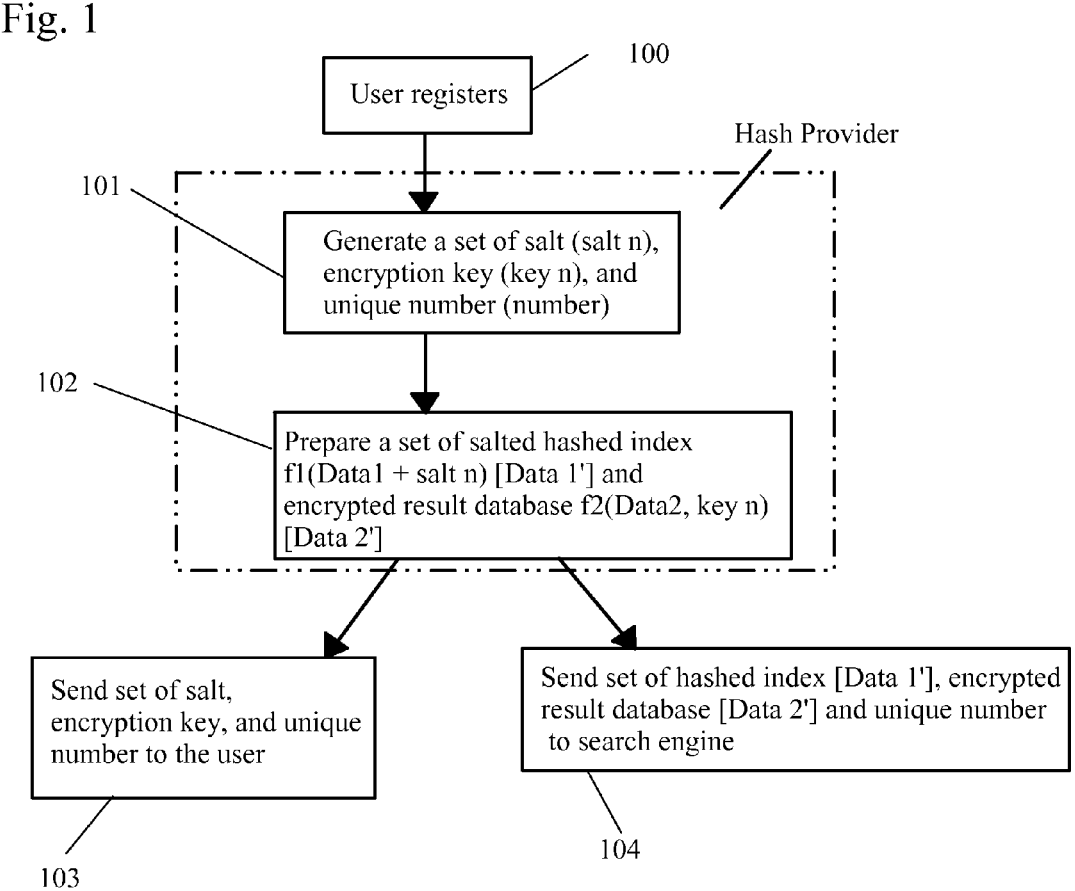
FIG. 1 shows a block diagram of registration steps.
Figure 2:
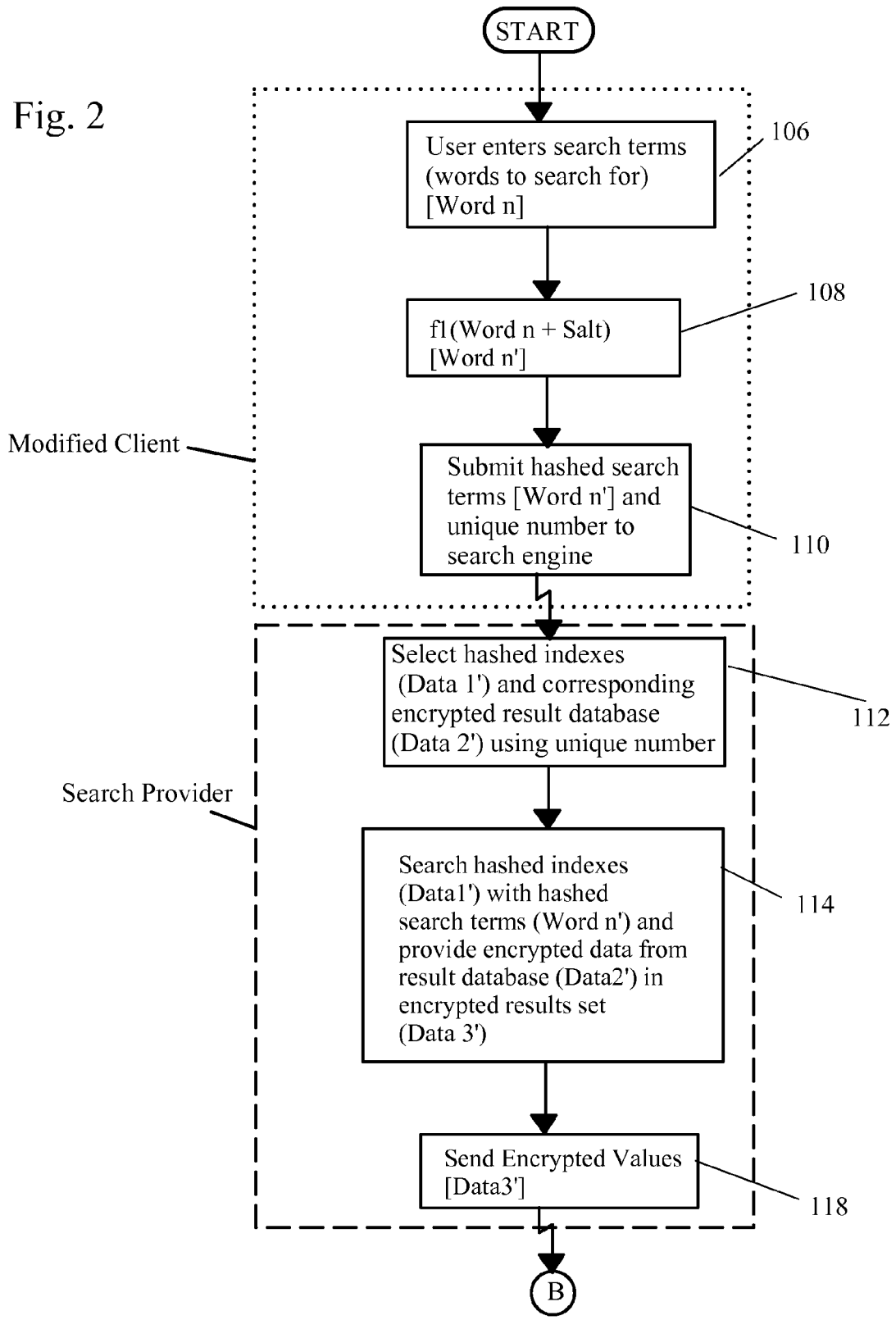
FIGS. 2-3 show a block diagram of a search engine organization of an embodiment of the present invention.
Figure 3:
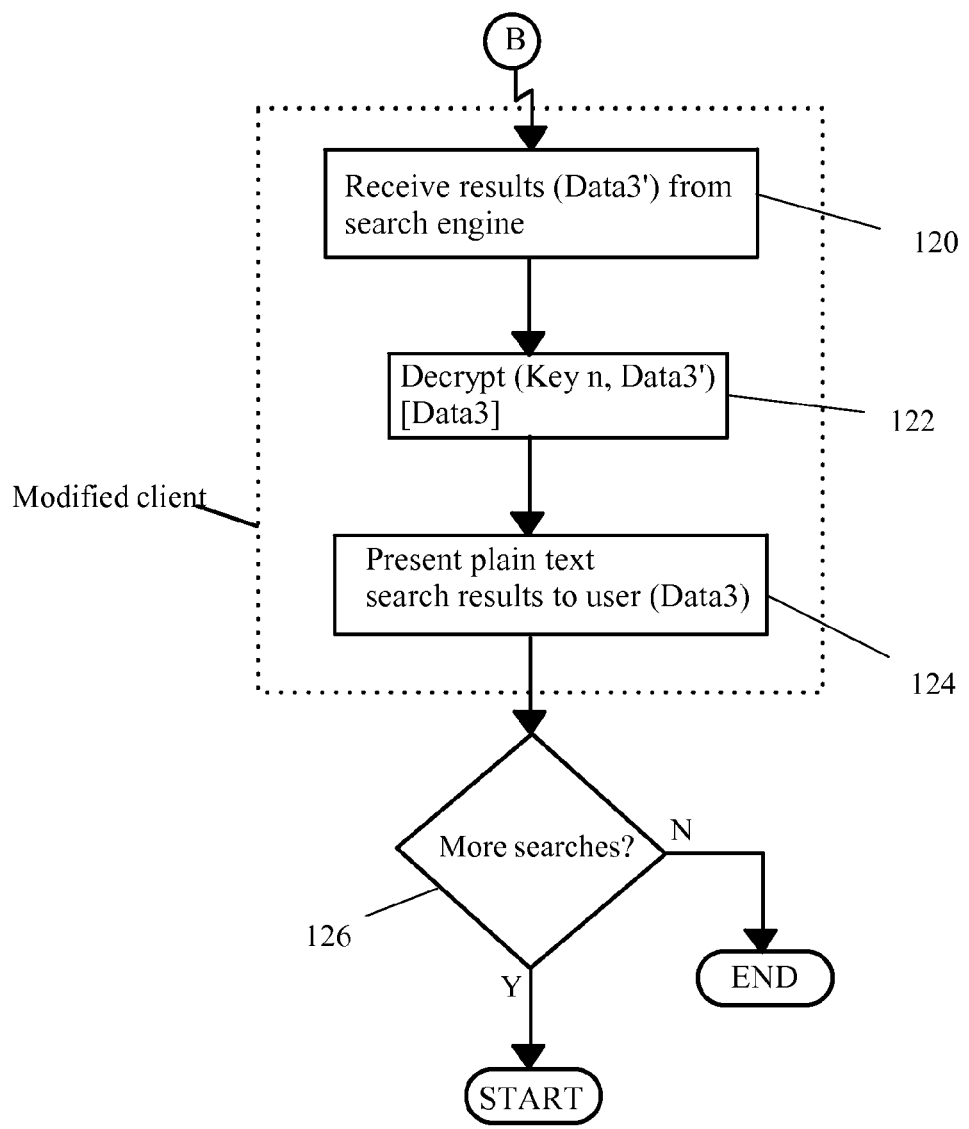

FIGS. 1-3 show block diagrams of the search engine system of the present invention. In the present invention, a hash algorithm is applied to search engine data to be searched, for example through indexed words. When the search is requested, the search terms entered by a user are also hashed, so that the terms sent to search engine are only known by the user. Additionally, symmetric encryption is used to encrypt a search engine's results, again only allowing the user to know the results of their search, allowing for private and anonymous searching.

The search engine system of the present invention requires the search engine organization to have at least two distinct groups clearly abiding by separation of duties, for example two entirely independent organizations, e.g. hash provider and search provider.

The hash provider provides and maintains a signup or registration for users to acquire a salt, encryption key and a temporary unique number, possible through a modified client such as a browser "add-on". The unique number maybe temporarily in nature and unique for a limited period of time. Registration can be provided by simple means that facilitates user registration on the fly, and for as many times as a user desires. Every registration results in the assignment of a new set of unique id number, salt and key. The salt and key pairs may be reused across dispersed users. Exchanging only the minimum amount of information necessary to facilitate registration and regular expiration of registered users is preferable. The registration serves the purpose of assigning a unique salt (or random string) and a unique encryption key to a user.

The hash provider creates hashed data sets by creating a salted hash of search engine data. This includes creating a hash of words used in the search index, not of necessarily whole phrases or documents. The hash provider may also perform the function of gathering and maintaining search engine data, for example, crawling and indexing web sites or these activities can be performed by another organization that provides this data to the hash provider.

The hash provider also symmetrically encrypts the URL and other data that the search engine returns as results or a results database, for example page descriptions and images. The encryption key is the one provided to the user or set of users previously. The data that is searched and the data provided as results are tied together as a set for every indexed page and the salt and key are also a set and correspond to each other.

For example if a webpage is indexed for the terms "outdoor," "dog," and "house," these words are independently hashed using salt n. This webpage has a URL of: http://xyz.tld/doghouse1234.html and description of "The best dog house money can buy." The URL and description are encrypted with key n. The set of salt n and key n are tied together.

Another independent group, the search provider, operates the search engine interface and maintains the software that performs the search of the hashed search terms (words) against the hashed search engine database. The hashes are treated as words, as each represents a single word, therefore new or additional search algorithms are not necessary.

The search provider and the hash provider will never have knowledge of what terms the user submitted to the search engine, nor the search results.

Referring to FIG. 1, the user registers 100 at a hash provider interface. The hash provider generates 101 a set of salt, encryption key, and unique temporary number.

The hash provider prepares 102 an index of search engine data (Data 1) and hashes the search engine data using an algorithm or cryptographic hash function (f1) and a salt to get a salted hashed index of search engine data (Data1') to be searched for the user's search terms. The hash provider also prepares 102 a result database (Data 2) and encrypts the result database (Data 2) using an algorithm or symmetric encryption function (f2) and a key to get an encrypted result database (Data 2') that encrypts data that is provided in the result database. The result database preferably includes a URL and brief description of the web site or an image. The URL and brief description of the web site or an image is selected from the results database when an associated index term is encountered. The hash provider sends 103 the set of salt, encryption key, and unique number to the user, and the hash provider sends 104 the hashed index of search engine data (Data V), the encrypted result database (Data 2'), and the unique number to the search engine.

Once the hashed index (Data 1'), the encrypted result database (Data 2') and unique number are sent 104 to the search provider, the user can enter 106 the search terms (Word n) in which the user want searched, into a modified client such as a web browser with an "add-on" or "plug-in" maintained by the search provider. The modified client will hash 108 using an algorithm or cryptographic hash function (f1) the search terms (Word n) with the user's salt to get (Word n'). Then, the modified client submits 110 search terms (Word n') and the unique number to the search engine interface operated by the search provider.

The search engine operated by the search provider receives the hashed values (Word n') and selects 112 the hashed indexes (Data 1') and corresponding encrypted result database (Data 2') using the user's unique number. The search engine searches 114 the hashed search terms (Word n') in the appropriate hashed index set to provide an encrypted result set (Data 3') from the encrypted data taken from the encrypted result database (Data 2'). The encrypted data (Data3') is then sent 118 to the user.

After the user receives 120 Data 3' from the search engine, the modified client decrypts 122 the returned encrypted search results Data 3' and presents 124 the decrypted results Data 3 to the user. If the user decides to search 126 additional terms, then the user returns and enters 106 another search. If the user decides not to search additional terms, then the method ends.

A unique salt is preferably used for each user or a set of users. Given the ability to hash all of the search engine data very quickly, a new salt can be generated for every (or almost every) search or session, though this is not necessary to achieve successful implementation. If no salt is used, the implementation will be flawed, as the search terms can be derived.

The hash function may be any iterative cryptographic hash function. The strength of the resulting hash, for example pre-image resistance, is dependent on the properties of the hash function selected. An example of a sufficient hash algorithm is a secured hash algorithm, SHA-256, which is designed by the National Security Agency and published by the National Institute of Standards and Technology (NIST) as a U.S. Federal Information Processing Standard.

Any symmetric-key encryption algorithm can be used. An example of a sufficient key algorithm is advanced encryption standard (AES) with a 128 or 256 bit key length as adapted as an encryption standard by the U.S. government.

The same random string could be used for both the salt and symmetric key, however it is not suggested to do so to avoid potential future attacks that could possibly reveal the key value when the same key is used by two different algorithms for likely related content.

The separation of duties between the hash provider and the search provider should be auditable as any common separation of duty (SOD) requirements are.

The distribution of the keys by the hash provider to the user can occur in an automated fashion to the user's client or client add-on via SSL (Secure Sockets Layer) or TLS (Transport Layer Security) or downloaded manually via SSL or TLS. It is neither necessary nor recommended to use a more complex key distribution scheme that could potentially uniquely identify a user, for example use of PKI (Public Key Infrastructure) to encrypt the keys with a user's unique public key.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A secure search method of securing searches of search engine data by a user using a search engine in which a hash provider computer comprising one or more processors, one or more computer readable memories, and one or more computer-readable mediums, communicates with the user and with a search engine provider operating the search engine, comprising:
the hash provider computer generating a set of a salt, an encryption key, and a unique number;
the hash provider computer using the salt, preparing a salted hashed index of search engine data;
the hash provider computer using the encryption key, preparing an encrypted result database of search engine data;
the hash provider computer sending the set of salt, encryption key, and unique number to the user; and
the hash provider computer sending the salted hashed index, the encrypted result database, and unique number to the search engine.

2. The method of claim 1, further comprising:
the user entering at least one search term into a modified client computer comprising one more computer readable memories, and one or more computer-readable mediums;
the modified client computer using the salt and hashing the at least one search term entered by the user; and
the modified client computer submitting the hashed at least one search term, and the unique number to the search engine.

3. A secure search method by a search engine operated by a search provider computer comprising one or more processors, one or more computer readable memories, and one or more computer-readable mediums, communicating with a user and a hash provider computer executing a search comprising:
the search provider computer receiving a salted hashed index, encrypted result database, and a unique number from the hash provider computer comprising one or more processors, one or more computer readable memories, and one or more computer-readable mediums;
the search provider computer storing the salted hashed index and encrypted result database associated with the unique number;
the search provider computer receiving at least one hashed search term and unique number from the user;
the search provider computer selecting the salted hashed index and encrypted result database associated with the unique number; and
the search provider computer searching the salted hashed index with the hashed search terms and returning data from the encrypted result database to user in an encrypted result set.

4. The method of claim 3, further comprising the user:
receiving the encrypted result set through a modified client computer comprising one more computer readable memories, and one or more computer-readable mediums;
decrypting the encrypted result set using the key through a modified client computer; and
displaying plain text search results through a modified client computer.

5. The method of claim 3, further comprising the hash provider computer, prior to receiving a salted hashed index, encrypted result database, and a unique number from the hash provider computer:
the hash provider computer generating a set of a salt, an encryption key, and a unique number;
the hash provider computer using the salt, preparing a salted hashed index of search engine data;
the hash provider computer using the encryption key, preparing an encrypted result database of search engine data;
the hash provider computer sending the set of salt, encryption key, and unique number to the user; and
the hash provider computer sending the salted hashed index, the encrypted result database, and unique number to a search engine.

* * * * *